United States Patent [19]

Tamburino et al.

[11] 4,067,410

[45] Jan. 10, 1978

[54] LOAD TRANSPORTING VEHICLES

[75] Inventors: James C. Tamburino, Roselle; E. A. Domes, Carpentersville; Lawrence A. Venere, Wood Dale, all of Ill.

[73] Assignee: International Harvester Company, Chicago, Ill.

[21] Appl. No.: 638,791

[22] Filed: Dec. 8, 1975

[51] Int. Cl.² .............................................. B60K 5/02
[52] U.S. Cl. .............................. 180/64 R; 180/44 R; 180/49
[58] Field of Search ................. 180/64 R, 49, 44 R, 180/54 R

[56] References Cited

U.S. PATENT DOCUMENTS

| 2,853,142 | 9/1958 | Roszler et al. | 180/54 R X |
| 3,411,601 | 11/1968 | Arkus-Duntov | 180/44 R |
| 3,614,989 | 10/1971 | Bott et al. | 180/44 R |
| 3,720,446 | 3/1973 | Kelley | 180/64 R X |
| 3,921,742 | 11/1975 | May et al. | 180/64 R X |

FOREIGN PATENT DOCUMENTS 662,398   12/1951   United Kingdom ............. 180/54 R Primary Examiner—Kenneth H. Betts
Assistant Examiner—Donn McGiehan
Attorney, Agent, or Firm—Douglas W. Rudy; Floyd B. Harman

[57] ABSTRACT

An off-the-road earth-moving truck having a rearwardly dumping body, has equal weight distribution between a steerable drive axle and a drive axle both when fully loaded and when empty.

2 Claims, 3 Drawing Figures

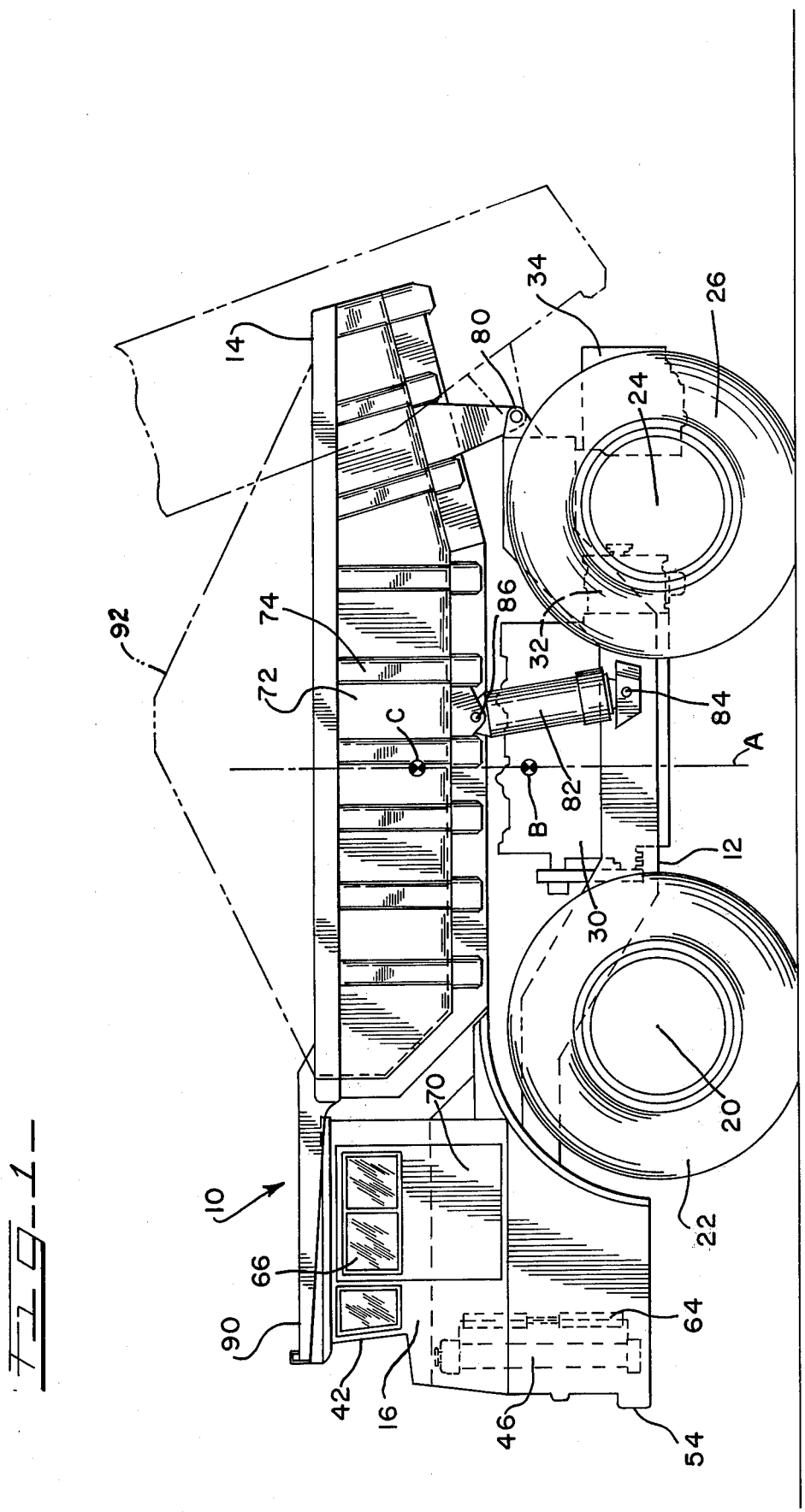

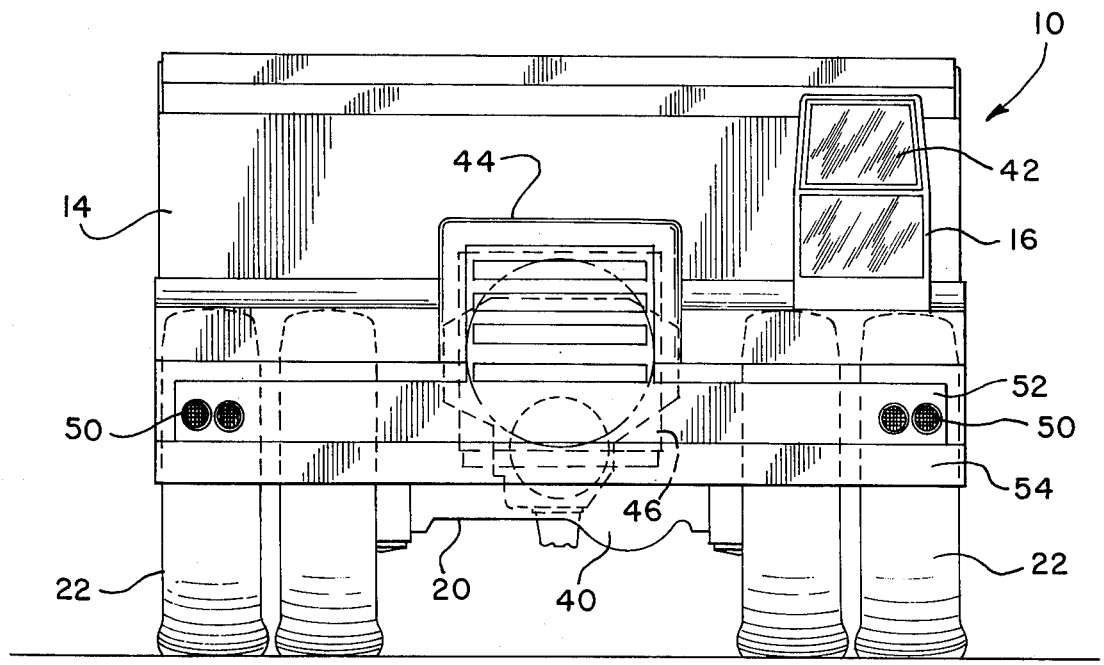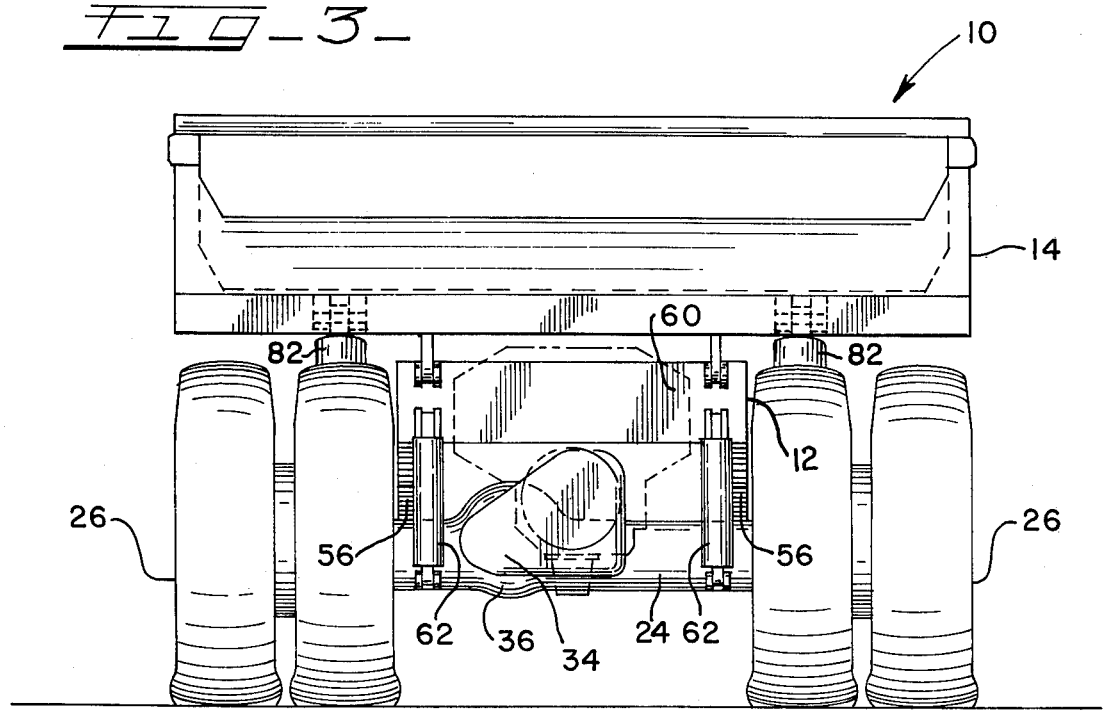

LOAD TRANSPORTING VEHICLES

BACKGROND OF THE INVENTION

1. Field of the Invention:

This invention relates to dump trucks and more specifically to off-the-road dump trucks having a driven forward steerable axle with tires mounted at either end of said axle and the second rearwardly disposed driven axle having tires mounted at each end thereof commonly called a 4 × 4 configuration as there are four wheels and each of these are driven.

2. Description of the Prior Art

Present large off-the-road dump trucks generally have a rather conventional layout. A typical large 4 × 4 will have the engine and transmission forward of the steerable drive axle at the front of the vehicle. A second driven axle will be located at the rear of the vehicle. In a well designed dump truck, the optimum weight distribution is fifty-fifty when loaded. This means that fifty percent of the combined vehicle and load weight is positioned over the front axle and fifty percent is positioned over the rear axle. In this condition the vehicle will be most stable when under way. Maximum traction will be transmitted to each driven wheel under this situation of equal weight distribution.

The placement of the vehicle engine and transmission in a conventional off-the-road dump truck offsets the weight of the load when the dump body is full. Unfortunately, the forward placement of the engine and the transmission adversely affects the weight distribution of the vehicle when it is not carrying a load. In an unloaded state the weight distribution on a conventional off-the-road dump truck is biased towards the front of the vehicle. This results in less than optimum mobility as the majority of the weight of the vehicle is on the front wheels. Note that the front wheels of an off-the-road vehicle are steerable wheels as well as being traction wheels. Thus the fact of having more than fifty percent of the vehicle weight on the front wheels may lead to difficulties in mobility. Not only will the tractive efficiency of the vehicle be impaired but the front tires will be exposed to excessive wear from carrying more than their proportional share of the load.

SUMMARY OF THE INVENTION

An off-the-road dump truck is provided having a fully laden weight distribution equal between its front and rear axles and also having equal weight distribution between the front and rear axles when the dump body is empty.

This ideal weight distribution is accomplished by providing a chassis having the vehicle motor means and torque converter located between the forward axle and the rearward axle and having the transmission mounted behind the rear axle. The dump body is supported at its forward end on a landing platform above the front axle and at the rear at a pivot point rearward of the rear axle. The vehicle transmission is carried behind the rear axle while the cab structure of the vehicle is carried forward of the front axle along with the vehicle heat exchanger.

It is an object of this invention to provide a dump truck that has substantially equal weight distribution between each of the pair of axles when the vehicle is empty as well as when the vehicle is full.

It is also an object of this invention to teach the most advantageous placement of major vehicle components in order to accomplish equal weight distribution between the axles.

BRIEF DESCRIPTION OF THE DRAWINGS

The aforesaid and additional objects and advantages of the invention will be more clearly understood from the following detailed description thereof when read in conjunction with the accompanying drawings in which:

FIG. 1 presents a side elevation view of the balanced off-the-road dump truck of the invention;

FIG. 2 is a front elevation view of the dump truck of FIG. 1; and

FIG. 3 is a rear elevation view of the dump truck of FIG. 1.

DETAILED DESCRIPTION OF THE DRAWINGS

FIG. 1 shows the balanced off-the-road dump truck of the invention. The vehicle, generally 10 consists of a frame 12, a dump body 14 and an operator's work station or cab 16. A steerable driven axle 20 mounted in a forward location and including ground engaging means such as a pair of steerable wheels with tires 22 as well as a non-steerable driven axle 24 including ground engaging means such as a pair of wheels with tires 26 are carried at the respective forward and aft locations of the frame 12.

The drive means of the vehicle includes a motor means 30. The drive transmitting means of the vehicle may include a drive shaft coupled to a torque converter 32 partially shown in broken lines behind the rear wheels and tires 26, and the torque converter output shaft (not shown) is coupled to a transmission 34. The vehicle motor means, generally an internal combustion diesel engine, is located between the forward (steerable and driven) axle and the aft (non-steerable and driven) axle. In order to accommodate the engine the frame is equipped with a lowered center section. The central section of the frame is lower than either the fore or aft sections of the frame. The frame is also equipped with component attaching tabs for accommodating various components of the vehicle that are mounted to the frame. The transmission is mounted on the aft side of the non-steerable driven axle 24 while the torque converter 32 is mounted on the forwad side of the same axle. A first drive shaft (not shown) couples the output shaft (not shown) of the transmission to the rear axle differential 36 (FIG. 3) which in turn is part of the non-steerable drive axle 24. A second drive shaft (not shown) provides motion transmission from the transmission to the differential 40 (FIG. 2) which is a component of the steerable drive axle 20 at the forward part of the frame.

The items just mentioned and shown may also be seen in FIGS. 2 and 3.

FIG. 2 shows the cab 16 at the front of the vehicle. Note that the cab is relatively small in relationship to the dump truck, however, it is large enough to comfortably accommodate at least the vehicle operator. The cab houses the vehicle control means including the steering control means, the motor means speed control means (accelerator) and the vehicle braking means. A windshield 42 allows the operator to see out of the cab in a forward and sideways direction.

A heat exchanger or radiator housing 44 contains an upright heat exchanger or radiator 46 (in dotted lines) centrally mounted on the forward part of the vehicle. Headlights 50 are mounted outboard of the center of the vehicle in a recess 52 above the front bumper 54.

FIG. 3, which is an elevation view of the rear of the vehicle, shows items mentioned earlier including the rear wheels and tires 26, the dump body 14 and the non-steerable driven axle 24 as well as several other items. The non-steerable driven axle 24 supports a portion of the mass of the vehicle by means of springs 56 interposed between the non-steerable driven axle 24 and the frame 12. Although springs are used in this embodiment other suspension means are contemplated as equivalents. For instance a pneumatic, hydraulic or hydro-pneumatic system may be substituted for the springs shown. This is equally applicable for the front suspension of the vehicle mentioned in the following paragraph.

A frame cross member 60 is clearly shown in FIG. 3. The function of this cross member is to connect the driver side or cab side frame rail to the opposite frame rail or off side frame rail in order to make a strong frame assembly. A pair of shock absorbers 62—62 are connected at lower mounting points to the non-steerable axle 24 and at upper mounting points to the frame 12 in the specific area of the frame cross member 60. These shock absorbers 62 as well as the springs 56 shown at the rear of the vehicle and front springs not shown make up the vehicle suspension system.

Returning to FIG. 1 several detail mechanisms may be noted. The front bumper 54 projects out in front of the heat exchanger 46 and the flow inducing cooling fan 64 (both shown with dotted line views). The operator's work station or cab 16, in addition to the windshield 42 previously mentioned, also includes side windows and a door 70 to allow ingress and egress from the work station.

The dump body 14 is of a load carrying capacity to complement the design of the dump truck chassis. The sides 72 of the dump body (cab side shown) are equipped with structural strenghtening channels 74. The dump body 14 is pivotally attached to the frame 12 at fulcrum point 80 which provides a pivot around which the dump body 14 can be pivoted to allow unloading thereof. A pair of lifting hoists or cylinders, cab side unit shown as 82, are provided on each side of the vehicle to lift the dump body 14. The lifting hoists are pivotally mounted ar their lower end 84 to the frame 12 and at an upper end 86 to the lifting point on a dump body 14. When these multiple cylinder telescopic hoists are activated they will pivot the dump body 14 around fulcrum point 80 to dump the load.

The dump body 14 may also include an extension 90 acting as a protective canopy to protect the forward portion of the vehicle from damage from falling objects.

The focus of this invention is to provide a load carrying vehicle, namely a dump truck, having substantially equal weight distribution when loaded, partially loaded or empty. This is done by assigning specific locations to major vehicle cmponents including locating the engine between the traction axles.

A vertical plane A transverses the vehicle substantially between the center point of the steerable drive axle 20 and the center point of the non-steerable drive axle 24. With the correct layout of the major vehicle components as shown in FIG. 1 the center of gravity of the vehicle will be on the plane A. If the vehicle is in an unloaded state the center of gravity will be approximately at the point B. With the full load the center of gravity will remain in the same transverse vertical plane A, however, it will be higher in the chassis of the vehicle, for example, point C on plane A.

In partial load conditions the center of gravity will progress upwardly on plane A from point B towards point C. In order to assure that the center of gravity remains substantially on plane A the load 92 must be appropriately loaded into the dump body 14. It should be assumed that after instruction a skilled loader operator can load the dump body such that the load is loaded in a correct manner.

The composition and the material being loaded into the dump body may have bearing on the distribution of the load. For instance, a homogeneous material having a consistent density could be loaded by a skilled loader to insure equal weight distribution on each axle whereas a single large boulder may be more difficult to load in a correct position. Inasmuch as these diverse situations may arise it should be pointed out that the vehicle may be operated almost as effectively with the loaded center of gravity somewhat out of the plane A.

The relationships of components on either side of the longitudinal center line of the vehicle are such that the longitudinal vertical plane corresponds with the center line of the vehicle. This insures equal loading of each end of each axle. For instance, the cab 16 may be located to the left of the longitudinal center line (the cabe side of the vehicle) and offset by the placement of the fuel tanks and batteries on the right side of the longitudinal center line (the off side of the vehicle). Judicious arrangement of component parts around the center line of the vehicle will aid in insuring that the cab side and the off side of the vehicle each have approximately the same weight.

In an ideal loaded or unloaded condition the center of gravity of the entire vehicle will be at the intersection point of the transverse vertical plane A located substantially between the axles and the longitudinal vertical plane corresponding to the longitudinal center line of the vehicle. The center of gravity would move up or down at this intersection point depending on the magnitude of the load being carried by the dump body.

Thus, it is apparent that there has been provided, in accordance with the invention, a load carrying vehicle or dump truck that full satisfies the objects, aims, and advantages set forth above. While the invention has been described in conjunction with the specific embodiments thereof it is evident that may alternatives, modifications and variations will be apparent to those skilled in the art in light of the foregoing description. For instance the motor means could be a conventional internal combustion engine or alternatively, a turbine motor which would give excellent results. Accordingly, this disclosure is intended to embrace all such alternatives, modifications and variations as fall within the spirit and broad scope of the appended claims.

What is claimed is:

1. A vehicle having a driven rear axle and a driven steerable front axle each carrying a pair of wheels and tires comprising:

a frame having a pair of longitudinal frame rails, each rail having an upper surface, said frame including a forward portion, an aft portion and a lowered center section where said upper surface of said frame rails along said lowered center section are substantially below the top elevation of said tires on said driven axles;

a motor means carried on said lowered center section of said frame between said driven rear axle and said steerable driven front axle;

a drive transmitting means communicating between said motor means and said axles;

a load carrying body having direct contact with said frame at portions other than said lowered center section;

a cab housing control means to direct the direction and velocity of said vehicle.

2. The invention in accordance with claim 1 wherein said vehicle loaded and unloaded has a center of gravity located on a vertical plane substantially equidistant from the center point of the driven steerable front axle and the center point of the driven rear axle.

* * * * *